US007929442B2

(12) United States Patent
Connor et al.

(10) Patent No.: US 7,929,442 B2
(45) Date of Patent: Apr. 19, 2011

(54) METHOD, SYSTEM, AND PROGRAM FOR MANAGING CONGESTION IN A NETWORK CONTROLLER

(75) Inventors: Patrick L. Connor, Portland, OR (US); Daniel R. Gaur, Beaverton, OR (US); Linden Cornett, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 10/882,534

(22) Filed: Jun. 30, 2004

(65) Prior Publication Data

US 2006/0013128 A1    Jan. 19, 2006

(51) Int. Cl.
*G04B 19/06* (2006.01)
(52) U.S. Cl. ...................................................... 370/235
(58) Field of Classification Search .................. 370/230, 370/236, 229, 233, 232, 236.1, 252, 253, 370/395
See application file for complete search history.

(56) References Cited

U.S. PATENT DOCUMENTS

| 5,231,633 | A  | * | 7/1993 | Hluchyj et al. | 370/429 |
| 6,868,065 | B1 | * | 3/2005 | Kloth et al. | 370/236 |
| 7,092,357 | B1 | * | 8/2006 | Ye | 370/230 |
| 7,499,402 | B2 | * | 3/2009 | Keating et al. | 370/235 |
| 2002/0012348 | A1 | * | 1/2002 | Mizuhara et al. | 370/392 |
| 2005/0147110 | A1 |   | 7/2005 | Connor | |

OTHER PUBLICATIONS

What is ARP?—a Word Definition from the Webopedia Computer Dictionary, Apr. 8, 2004; http://www.webopedia.com/TERM/A/ARP.html; 2 pp.
What is ICMP?—a Word Definition from the Webopedia Computer Dictionary, Apr. 8, 2004; http://www.webopedia.com/TERM/I/ICMP.html; 2 pp.
What is IP?—a Word Definition from the Webopedia Computer Dictionary, Apr. 8, 2004; http://www.webopedia.com/TERM/I/IP.html; 3 pp.
What is PING?—a Word Definition from the Webopedia Computer Dictionary, Apr. 8, 2004; http://www.webopedia.com/TERM/P/PING.html; 2 pp.
CERT Advisory CA-1996-21 TCP SYN Flooding and IP Spoofing Attacks, Apr. 22, 2004; http://www.cert.org/advisories/CA-1996-21.html; 9 pp.
CERT Advisory CA-1998-01 Smurf IP Denial-of-Service Attacks, Apr. 22, 2004; http://www.cert.org/advisories/CA-1998-01.html; 8 pp.
Distributed Weighted Random Early Detection, Apr. 28, 2004; http://www.cisco.com/univercd/cc/td/doc/product/software/ios111/cc111/wred.htm; 15 pp.
Flow-based WRED, Apr. 28, 2004; http://akson.sgh.waw.pl/ chopin/ios120/120newft/120t/120t3/flowwred.htm; 18 pp.

(Continued)

*Primary Examiner* — Seema S Rao
*Assistant Examiner* — Henry Baron
(74) *Attorney, Agent, or Firm* — Konrad Raynes & Victor LLP

(57) ABSTRACT

Provided are a method, system, and program for managing congestion in a network controller, which in one embodiment, substantially all packets having an assigned priority value below a selected priority level are culled. In another embodiment, selected flows of packets into a network controller are culled at selected culling rates. In one example, a selected flow may be drastically culled. In another example, all flows may be culled at a certain rate which does not exceed a maximum for each flow. In another example, culling techniques may be combined.

72 Claims, 7 Drawing Sheets

OTHER PUBLICATIONS

QOS Congestion Avoidance, Apr. 13, 2004; http://www.cisco.com/en/US/tech/tk543/tk760/tech_protocol_family_home.html; 1 p.

Allman, M., "TCP Congestion Control," RFC 2581 dated Apr. 1999; http://www.faqs.org/rfes/rfc2581.html accessed Apr. 13, 2004; 11 pp.

Postel, J. "User Datagram Protocol," RFC 768 dated Aug. 28, 1980; http://www.ietf.org/rfc/rfc0768.txt?number=768 accessed May 4, 2004; 3 pp.

* cited by examiner

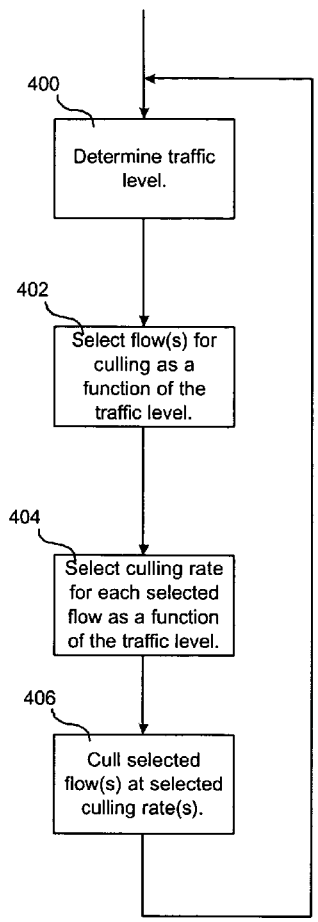
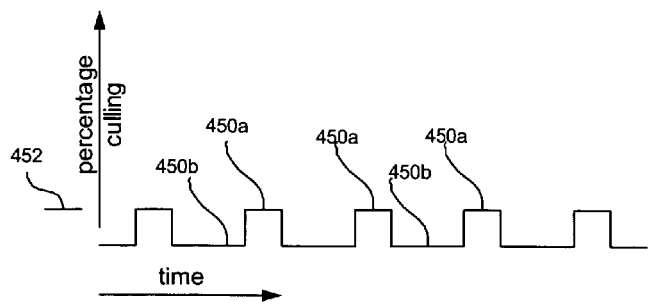
FIG. 9a
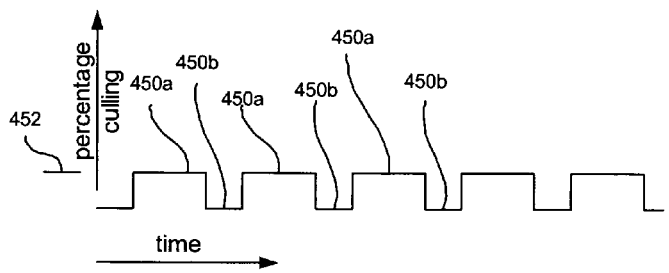
FIG. 9b
FIG. 7

METHOD, SYSTEM, AND PROGRAM FOR MANAGING CONGESTION IN A NETWORK CONTROLLER

RELATED APPLICATIONS

U.S. patent application, entitled "Method, System and Program for Overrun Identification," Ser. No. 10/745,774, filed Dec. 24, 2003.

DESCRIPTION OF RELATED ART

In a network environment, a network adapter or controller such as an Ethernet controller, Fibre Channel controller, etc., will receive Input/Output (I/O) requests initiated by an application operating in the host computer in which the adapter resides. Often, the host computer operating system includes a device driver to communicate with the network adapter hardware to manage I/O requests to transmit or receive data over a network.

Many network controllers have a buffer to receive large bursts of incoming data traffic. Notwithstanding this buffering capacity, network controllers are subject to an "overflow" condition when the rate of incoming traffic exceeds the rate at which the data of the traffic can be processed. When an overflow condition occurs, the network controller typically drops some of the incoming data because the network controller is unable to store the data for processing.

These overflow conditions may occur as a result of a surge in incoming traffic. However, overflow conditions may also be artificially induced through malicious behavior such as a "denial-of-service" attack. In either case, data loss may occur.

The host computer may also employ a protocol which packages the data to be transmitted over the network into packets, each of which contains a destination address as well as a portion of the data to be transmitted. A protocol layer can also process the packets received by the network adapter that are stored in the packet buffer, and access any I/O commands or data embedded in the packet.

For instance, the computer may employ the TCP/IP (Transmission Control Protocol and Internet Protocol) to encode and address data for transmission, and to decode and access the payload data in the TCP/IP packets received at the network adapter. IP specifies the format of packets, also called datagrams, and the addressing scheme. TCP is a higher level protocol which establishes a network connection between a destination and a source according to the TCP protocol.

In accordance with the TCP protocol, a TCP stack hosted by the host computer may advertise a TCP "receive window" which the data packet sender can utilize to restrict the transmission of data to the data recipient host computer. Typically, the size of the TCP receive window is set by the host computer in accordance with the buffer space set aside for data packet reception.

A device driver, application or operating system can utilize significant host processor resources to handle network transmission requests to the network adapter. One technique to reduce the load on the host processor is the use of a TCP/IP Offload Engine (TOE) in which TCP/IP protocol related operations are embodied in the network adapter hardware as opposed to the device driver or other host software. As a-result, the host processor can be relieved from performing some or all of the TCP/IP protocol related operations.

A TOE or other offload engine can speed the processing of incoming traffic and thereby alleviate some overflow conditions. However, because a TOE may utilize a network controller buffer for a number of tasks in addition to those typically handled by a network controller lacking a TOE, additional opportunities for packet loss may occur. For example, a TOE device may retain packets or segments of data in a buffer for reassembly, defragmentation or retransmission processing. In a network controller lacking a TOE, such data may be immediately forwarded to the host computer for processing rather than being retained in the network controller for processing. Hence, buffer space which may otherwise be available for incoming data may be consumed by TOE processing. Furthermore, buffer space may be used for non-TCP traffic such as the User Datagram Protocol (UDP), Internet Control Message Protocol (ICMP), non-IP traffic as well as non-offloaded TCP flows. Hence, these non-TCP traffic flows can consume buffer space which may have been advertised as available to TCP flows. Still further, a host based TCP stack may have significantly greater buffer space residing in the host system memory as compared to that typically available to the TOE in local memory.

As previously mentioned, output buffers can fill during periods of congestion. When the buffers are full, "tail drop" is likely to occur, that is, additional packets are likely to be dropped. In accordance with the known TCP protocol, dropping packets can cause the packet sender to reduce the rate of transmission to reduce congestion. Since the packets are often dropped all at once, global synchronization of TCP hosts can occur as multiple TCP hosts reduce their transmission rates. Once the congestion clears, the TCP hosts can increase their transmissions rates, resulting in waves of congestion followed by periods where the transmission link is not fully used.

There are known techniques for reducing or avoiding overflow conditions. The Random Early Detection (RED) technique randomly selects one or more "victim" packets and drops them to reduce traffic flow. RED can reduce the chances of tail drop by selectively dropping packets when the interface begins to show signs of congestion. By dropping some packets early rather than waiting until the buffer is full, RED can, in some instances, avoid dropping large numbers of packets at once and can reduce chances of global synchronization. In addition, RED statistically tends to drop more packets from large users than small. Therefore, traffic sources that generate the most traffic may, in some applications, be more likely to be slowed down than traffic sources that generate little traffic.

Another known technique is the Weighted Random Early Detection (WRED) technique in which packets having a high IP precedence are less likely to dropped than packets with a lower precedence. In accordance with the known TCP protocol, packet header bits can define IP precedence factors such as minimum delay, maximum throughput, maximum reliability or minimum cost. These factors may be utilized to assign an IP precedence. A "Distributed Weighted Random Early Detection" technique can run on Versatile Interface Processor (VIP)-distributed processors and may provide additional functionality such as minimum and maximum queue depth thresholds and drop capabilities for each class of service.

A "Flow-based Weighted Random Early Detection" technique can provide a feature of WRED that forces a WRED policy to afford greater fairness to all flows on an interface in regard to how packets are dropped. More specifically it is believed that when a flow exceeds a per-flow limit, the probability that a packet from that flow will be dropped increases.

Notwithstanding, there is a continued need in the art to improve the performance of data reception and other operations.

BRIEF DESCRIPTION OF THE DRAWINGS

Referring now to the drawings in which like reference numbers represent corresponding parts throughout:

FIG. 7 illustrates yet another embodiment of operations to manage congestion in a network controller in accordance with the present description;

FIGS. 9a and 9b illustrate techniques for culling packets in a flow of in accordance with one embodiment of the present description.

DETAILED DESCRIPTION OF ILLUSTRATED EMBODIMENTS

In the following description, reference is made to the accompanying drawings which form a part hereof and which illustrate several embodiments of the present disclosure. It is understood that other embodiments may be utilized and structural and operational changes may be made without departing from the scope of the present description.

Figure 1:
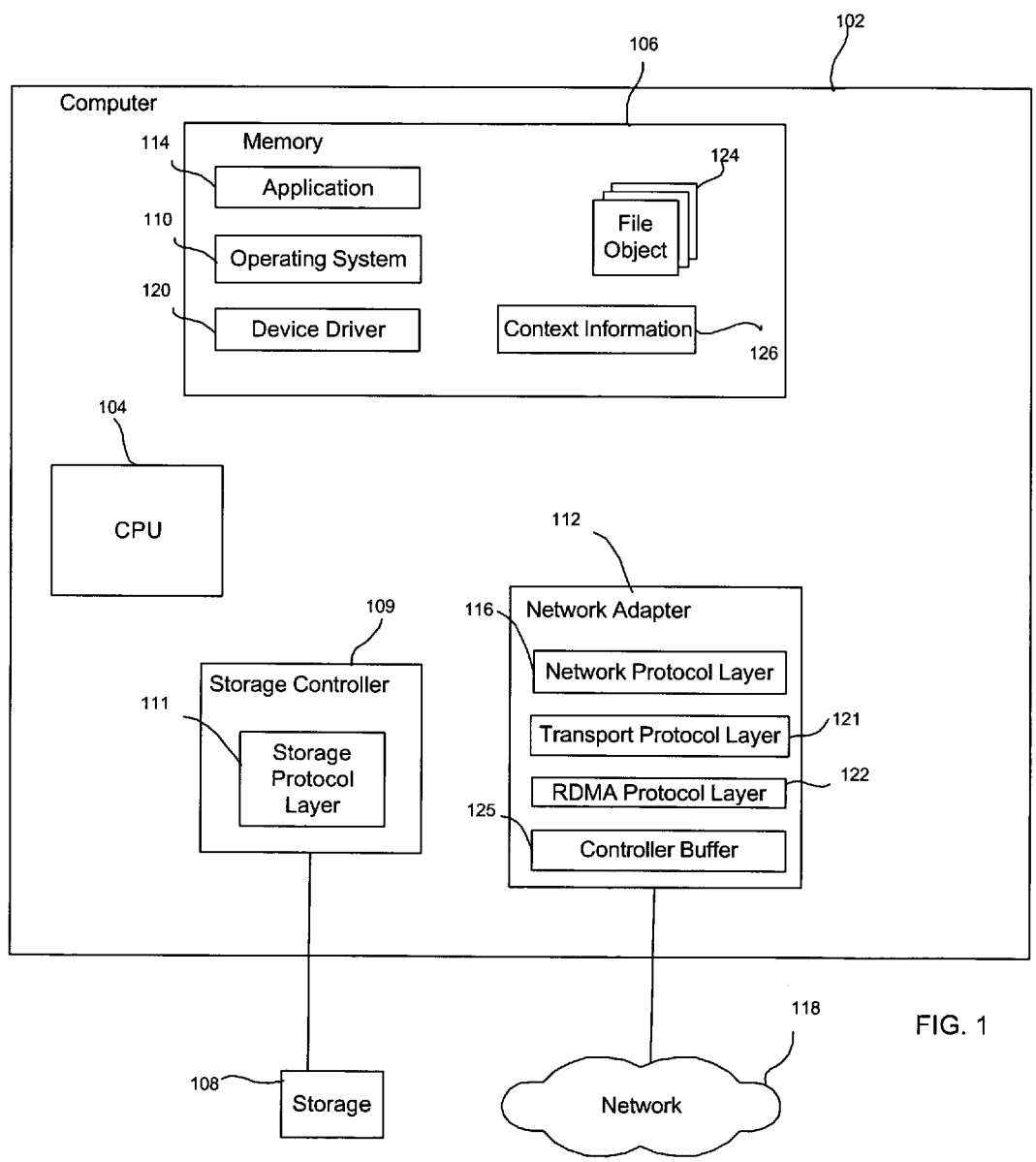
FIG. 1 illustrates an embodiment of a computing environment in which aspects of the description provided herein are employed.

FIG. 1 illustrates an example of a computing environment in which aspects of described embodiments may be employed. A computer 102 includes one or more central processing units (CPU) 104 (only one is shown), a memory 106, non-volatile storage 108, a storage controller 109, an operating system 110, and a network adapter 112. An application 114 further executes in memory 106 and is capable of transmitting and receiving packets from a remote computer. The computer 102 may comprise any computing device known in the art, such as a mainframe, server, personal computer, workstation, laptop, handheld computer, telephony device, network appliance, virtualization device, storage controller, storage controller, etc. Any CPU 104 and operating system 110 known in the art may be used. Programs and data in memory 106 may be swapped into storage 108 as part of memory management operations.

The storage controller 109 controls the reading of data from and the writing of data to the storage 108 in accordance with a storage protocol layer 111. The storage protocol of the layer 111 may be any of a number of known storage protocols including Redundant Array of Independent Disks (RAID), High Speed Serialized Advanced Technology Attachment (SATA), parallel Small Computer System Interface (SCSI), serial attached SCSI, etc. Data being written to or read from the storage 108 may be cached in accordance with known caching techniques. The storage controller may be integrated into the CPU chipset, which can include various controllers including a system controller, peripheral controller, memory controller, hub controller, I/O bus controller, etc.

The network adapter 112 includes a network protocol layer 116 to send and receive network packets to and from remote devices over a network 118. The network 118 may comprise a Local Area Network (LAN), the Internet, a Wide Area Network (WAN), Storage Area Network (SAN), etc. Embodiments may be configured to transmit data over a wireless network or connection, such as wireless LAN, Bluetooth, etc. In certain embodiments, the network adapter 112 and various protocol layers may employ the Ethernet protocol over unshielded twisted pair cable, token ring protocol, Fibre. Channel protocol, Infiniband, etc., or any other network communication protocol known in the art. The network adapter controller may be integrated into the CPU chipset, which can include various controllers including a system controller, peripheral controller, memory controller, hub controller, I/O bus controller, etc.

A device driver 120 executes in memory 106 and includes network adapter 112 specific commands to communicate with a network controller of the network adapter 112 and interface between the operating system 110, applications 114 and the network adapter 112. As used herein, an application 114 can include a driver which is at a higher level than the device driver 120 for the network adapter 112, and can also include portions of the operating system 110. The network controller can include the network protocol layer 116 and can control other protocol layers including a data link layer and a physical layer which includes hardware such as a data transceiver.

In certain embodiments, the network controller of the network adapter 112 includes a transport protocol layer 121 as well as the network protocol layer 116. For example, the network controller of the network adapter 112 can include a transport protocol controller such as a TOE, in which many transport layer operations can be performed within the network adapter 112 hardware or firmware, as opposed to the device driver 120 or other host software.

The transport protocol operations include obtaining transmit data placed in an application buffer residing in the system memory 106, temporarily storing the transmit data in a buffer such as a network controller buffer 125, packaging the transmit data in TCP/IP packets with checksum and other information and sending the packets. These sending operations are performed by an agent which may be embodied in a TOE, a network interface card or integrated circuit, a driver, TCP/IP stack, a host processor or a combination of these elements. The transport protocol operations also include receiving a TCP/IP packet from over the network, temporarily storing the received packets in a buffer such as the network controller buffer 125, and unpacking the TCP/IP packet to access the payload data. These receiving operations are performed by an agent which again, may be embodied in a TOE, a driver, a host processor or a combination of these elements.

The network layer 116 handles network communication and provides received TCP/IP packets to the transport protocol layer 121. The transport protocol layer 121 interfaces with the device driver 120 or operating system 110 or an application 114, and performs additional transport protocol layer operations, such as processing the content of messages included in the packets received at the network adapter 112 that are wrapped in a transport layer, such as TCP and/or IP, the Internet Small Computer System Interface (iSCSI), Fibre Channel SCSI, parallel SCSI transport, or any transport layer protocol known in the art. The transport protocol layer 121 can unpack the payload from the received TCP/IP packet and transfer the data to the device driver 120, an application 114 or the operating system 110.

In certain embodiments, the network controller and network adapter 112 can further include an RDMA (Remote Direct Memory Access) protocol layer 122 as well as the transport protocol layer 121. For example, the network controller of the network adapter 112 can include a Remote Direct Memory Access (RDMA) enabled Network Interface Card (RNIC), in which RDMA layer operations are performed within the network adapter 112 hardware, as opposed to the device driver 120 or other host software. Thus, for example, the system 102 can receive messages over an RDMA connection through the device driver 120, the transport protocol layer 121, the RDMA protocol layer 122 and the other protocol layers of the network adapter 112 including the data link and physical protocol layers.

The memory 106 further includes file objects 124, which also may be referred to as socket objects, which include information on a connection to a remote computer over the network 118. The application 114 uses the information in the file object 124 to identify the connection. The application 114 uses the file object 124 to communicate with a remote system. The file object 124 may indicate the local port or socket that will be used to communicate with a remote system, a local network (IP) address of the computer 102 in which the application 114 executes, how much data has been sent and received by the application 114, and the remote port and network address, e.g., IP address, with which the application 114 communicates. Context information 126 comprises a data structure including information the device driver 120, operating system 110 or an application 114, maintains to manage requests sent to the network adapter 112 as described below.

In the illustrated embodiment, the CPU 104 programmed to operate by the software of memory 106 including one or more of the operating system 110, applications 114, and device drivers 120 provides a host which interacts with the network adapter 112. A host may be embodied in a variety of devices such as a host computer 102 or other devices. In the illustrated embodiment, a data send and receive agent includes the transport protocol layer 121 and the network protocol layer 116 of the network interface 112. However, the data send and receive agent may be embodied in a TOE, a network interface card or integrated circuit, a driver, TCP/IP stack, a host processor or a combination of these elements. The network controller may comprise hardware, software, firmware or any combination of these elements.

Figure 2:
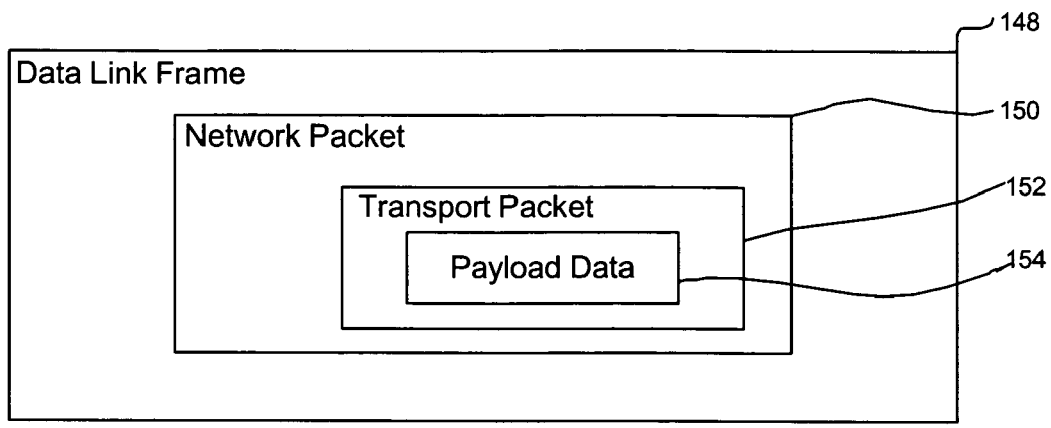
FIG. 2 illustrates a prior art packet architecture.

FIG. 2 illustrates a format of a network packet received at or transmitted by the network adapter 112. A data link frame 148 uses a format understood by the data link layer, such as 802.11 Ethernet. Details on this Ethernet protocol are described in "IEEE std. 802.11," published 1999-2003. An Ethernet frame includes additional Ethernet components, such as a header and an error checking code (not shown). The data link frame 148 includes a network packet 150, such as an IP datagram. The network packet 150 uses a format understood by the network protocol layer 116, such as such as the IP protocol. A transport packet 152 is included in the network packet 150. The transport packet 152 is capable of being processed by the transport protocol layer 121, such as the TCP. The packet may be processed by other layers in accordance with other protocols including iSCSI protocol, Fibre Channel SCSI, parallel SCSI transport, etc. The transport packet 152 includes payload data 154 as well as other transport layer fields, such as a header and an error checking code. The payload data 152 includes the underlying content being transmitted, e.g., commands, status and/or data. The driver 120, operating system 110 or an application 114 may include a layer, such as a SCSI driver or layer, to process the content of the payload data 154 and access any status, commands and/or data therein.

In accordance with one aspect of the description provided herein, the likelihood of an overflow condition may be reduced or eliminated by culling low priority traffic when overflow is imminent. The culled low priority traffic may be queued for later processing or discarded entirely. In one embodiment, different types of packets may be recognized and assigned various priority values. The method of priority assignment may be dynamic or programmable. When the protocol layer, embodied in hardware, software or both, detects a potential overrun situation, a priority scheme may be used to discard (or queue) all or substantially all low-priority traffic automatically. As a consequence, resources may be freed for higher-priority connections, allowing them to continue operating with little or no degradation.

Figure 3:
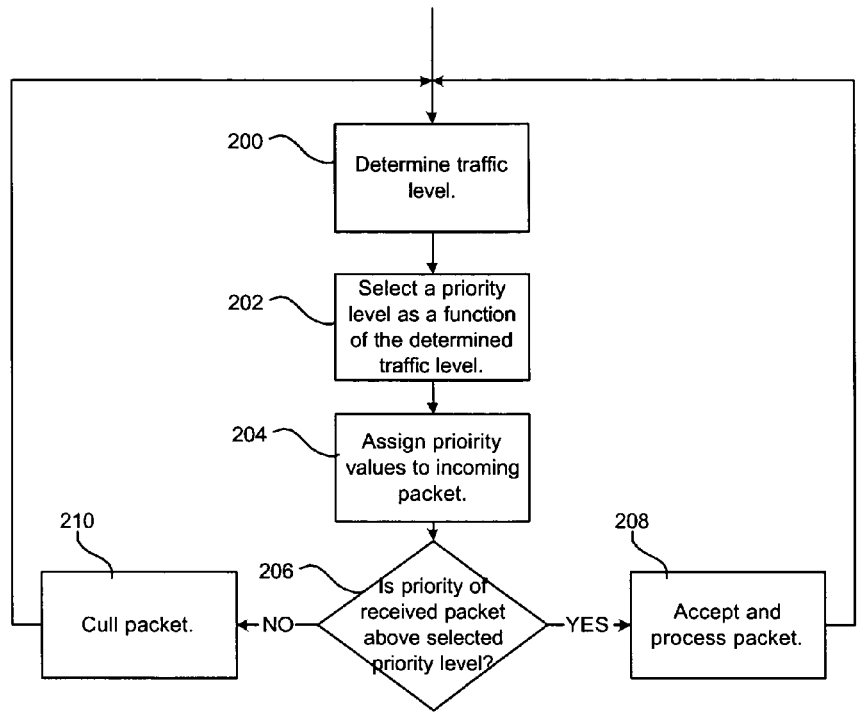
FIG. 3 illustrates one embodiment of operations to manage congestion in a network controller in accordance with the present description.

FIG. 3 illustrates one example of operations of a network controller for managing data traffic to reduce or eliminate overflow conditions. In the illustrated embodiment, the network controller is embodied in the network adapter 112 which includes a TOE which provides protocol layer processing including the TCP protocol. It is appreciated that the functions of one or both of the network controller and the TCP stack may be embodied in one or more of hardware, software or firmware, residing in one or more of the network adapter 112, CPU 104, operating system 110 or device driver 120 or other hardware or software modules.

The network controller determines (block 200) the level of the traffic flowing through the network adapter 112. These levels may include two levels such as light or heavy, for example, or may include several levels such as low, moderate, heavy or very heavy, for example. Other traffic levels may be utilized as well. The traffic levels may be based on a variety of criteria including the space remaining in a TOE buffer 125, the rate of data flow into the network adapter 112 from the network 108 versus the rate of data flow out of the network adapter 112 to the host computer, as well as other factors.

A priority discrimination level is selected (block 202) as a function of the determined traffic level. The priority discrimination levels which may be selected include two levels such as low or high priority discrimination levels or may include several priority discrimination levels such as low, medium, high or critical priority discrimination levels.

Packets of incoming traffic may each be assigned (block 204) priority values based upon a variety of criteria as described below. The priority values which may be assigned may include two values such as low or high priority values or may include several priority values such as low, medium, high or critical priority values, for example.

A determination is made (block 206) as to whether a particular packet has an assigned priority value which is above the selected priority discrimination level. If so, the packet is accepted (block 208) and processed in the usual fashion. On the other hand, if the packet has an assigned priority value which is lower than the selected priority discrimination level, the packet is culled (block 210) and the processing of that packet is deferred or dropped altogether. Such a processing deferment may take the form of placing the packet in a queue to await further processing if resources become available or may include discarding the packet. A discarded packet may then be subsequently processed if resent by the sender and accepted by the network adapter 112 should the priority discrimination level be decreased to permit acceptance of the packet. By processing packets in this manner as traffic levels rise, overflow conditions may be reduced or eliminated.

As previously mentioned, packets of incoming traffic may each be assigned (block 204) priority values based upon a variety of criteria. Different applications may assign different priority values to different types of traffic. For example, TCP segments carrying large quantities of data may be assigned a high priority value since loss of such a packet may cause the retransmission of all of the data of the lost segment, further adding to congestion problems.

As another example, IP fragments may be assigned a high priority value. Loss of an IP fragment can reduce or eliminate the value of sibling fragments which have already been retained or processed. In addition, loss of an IP fragment can cause re-fragmentation of the original data and retransmission of each fragment, again possibly aggravating congestion problems.

Also, TCP acknowledgment packets, referred to as "ACK," may also be assigned a high priority value in some applications. Loss of an ACK packet can cause data retransmission and interfere with TCP congestion management. Thus, for example zero-length ACK packets may not be dropped in many applications.

Yet another example of packets which may be assigned a high priority value could include traffic initiated by interactive applications such as, for example, multi-media streams, remote login, etc., in which a user is actively waiting for this traffic. Significant delays or data loss can degrade the "user experience."

Conversely, ICMP packets may be assigned a low priority value in some applications. ICMP packets in the IP protocol contain error, control and informational messages. For example, the "ping" command uses ICMP to test an Internet connection. ICMP traffic is often unreliable; therefore the loss of a few ICMP packets may not have significant consequences. Furthermore, it is believed that discarding ICMP traffic during overflow situations can prevent certain types of denial of service attacks such as "smurf" denial of service attacks, for example.

As another example, real-time or isochronous multi-media traffic may be assigned a low priority value. These types of protocols may elect to ignore lost data, since the delay incurred in retransmitting the data may make the retransmitted data effectively of little or no value to the receiver. For example, resending a portion of audio commentary may not be helpful if the listener has already advanced past that segment of the audio.

Also, in some applications, Address Resolution Protocol (ARP) or TCP SYN packets may be assigned a low priority value. These packets typically precede the establishment of a network connection to the local host computer. If the controller is already overloaded with traffic, establishing a new connection can aggravate the condition. Furthermore, it is believed that discarding these types of packets in an overload or incipient overload condition can ameliorate or prevent other types of denial of service attacks such as TCP SYN flooding and IP spoofing attacks. It is appreciated that other criteria may be used to assign various priority values to different types of packets.

Figure 4:
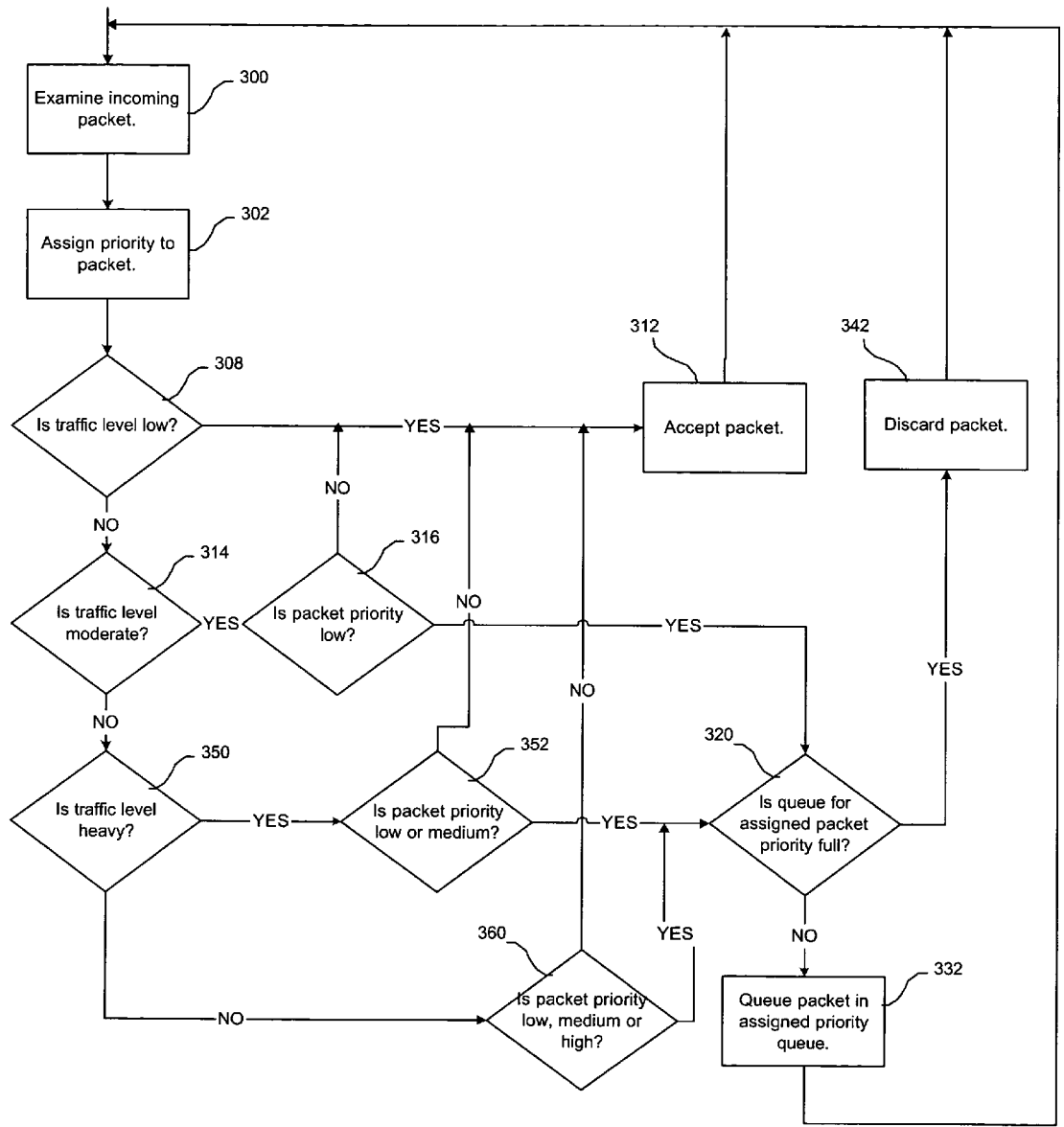
FIG. 4 illustrates another embodiment of operations to manage congestion in a network controller in accordance with the present description.

FIG. 4 illustrates another example of operations of a network controller for managing data traffic to reduce or eliminate overflow conditions. In this embodiment, incoming packets are examined (block 300) and a priority value is assigned (block 302) each incoming packet. In this example, a packet may be assigned one of four priority values, low, medium, high or critical priority as represented by the four categories, 304a, 304b, 304c or 304d, respectively, in FIG. 5. As previously mentioned, there may be a greater or lesser number of possible priority values, depending upon the particular application.

Also in this example, the traffic level may be determined to have one of four different possible levels, low, moderate, heavy or very heavy. A traffic level may be assigned a "heavy" designation when overflow conditions become possible, for example. A traffic level may be assigned a "very heavy" designation when overflow conditions are more than possible but are more likely to be imminent. Again, there may be a greater or lesser number of different possible traffic levels, based on these or other criteria, depending upon the particular application.

Figure 5:
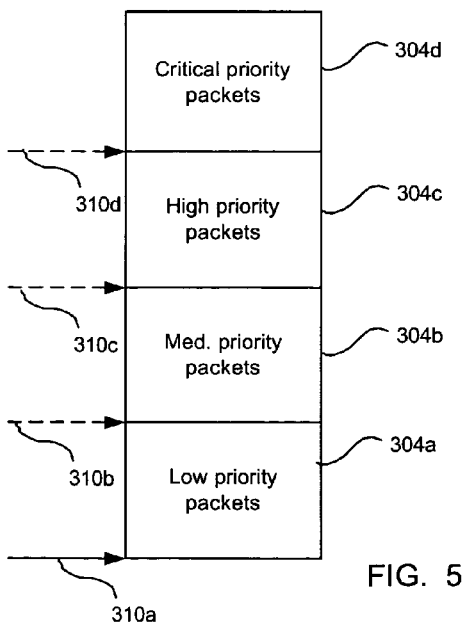
FIG. 5 illustrates one example of setting priority levels in connection with the embodiment of FIG. 5.

If the traffic level is determined (block 308) to be "low", a first priority discrimination level 310a is selected as shown in FIG. 5. At this level 310a, all packets including low, medium, high and critical priority packets are accepted (block 312) and processed.

If the traffic level is determined (block 314) to be moderate, a second, higher priority discrimination level 310b is selected. At this priority discrimination level 310b, a determination is made (block 316) as to whether the incoming packet has been assigned a low priority. If not, that is, the incoming packet has a medium, high or critical priority as shown in FIG. 5, the incoming packet is accepted (block 312) and processed.

Figure 6:
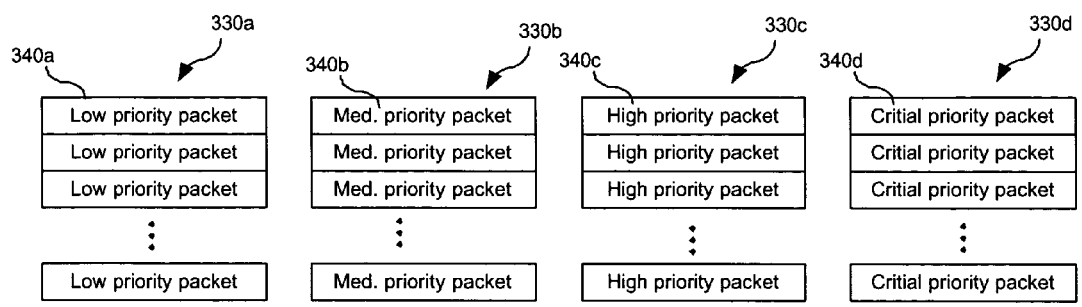
FIG. 6 illustrates an example of queues which may be used in connection with the operations of FIG. 5.

If it is determined (block 316) that the incoming packet is a low priority packet, a determination is made (block 320) as to whether a queue for the assigned packet priority is fill. In the illustrated embodiment, four queues, 330a, 330b, 330c, 330d (FIG. 6), are provided for the four packet priority values low, medium, high and critical, respectively.

Thus, if it is determined (block 316) that the incoming packet is a low priority packet, a determination is made (block 320) as to whether the queue 330a for the packets assigned a low priority value is full. If not, the low priority packet may be queued (block 332) in the queue 330a as shown by a low priority packet 340a. In the illustrated embodiment, the queues 330a, 330b, 330c, 330d may be first in first out (FIFO) queues such that the first packets placed in the queue are the first packets processed should resources permit. It is appreciated, however, that other types of queues may be used as well, depending upon the particular application. In this manner, processing of the low priority packets may be deferred until resource availability permits.

If it is determined (block 316) that the incoming packet is a low priority packet, and it is determined (block 320) that the queue 330a for low priority packets is full, the low priority packets may be discarded (block 342) until additional space in the queue 330a becomes available as the queued packets are subsequently processed.

If the traffic level is determined (block 350) to be heavy, a third, still higher priority discrimination level 310c is selected. At this priority discrimination level 310c, a determination is made (block 352) as to whether the incoming packet has been assigned a low or medium priority. If not, that is, the incoming packet has a high or critical priority as shown in FIG. 5, the incoming packet is accepted (block 312) and processed.

If it is determined (block 352) that the incoming packet is a low or medium priority packet, a determination is made (block 320) as to whether the queue for the assigned packet priority is full. Thus, if it is determined (block 352) that the incoming packet is a low priority packet, a determination is made (block 320) as to whether the queue 330a for the packets assigned a low priority value is full. Alternatively, if it is determined (block 352) that the incoming packet is a medium priority packet, a determination is made (block 320) as to whether the queue 330b for the packets assigned a medium priority value is full. If queue of the assigned priority is not full, an incoming low priority packet may be queued (block 332) in the queue 330a as shown by the packet 340a, for example. Similarly an incoming medium priority packet may be queued (block 332) in the queue 330b for medium priority packets as shown by the packet 340b, for example. In this manner, processing of the low and medium priority packets may be deferred until resource availability permits.

If it is determined (block 352) that the incoming packet is a low or medium priority packet, and it is determined (block 320) that the associated queue 330a or 330b for packets of the assigned priority is full, the packets of that priority may be discarded (block 342) until additional space in the associated queue 330a or 330b becomes available as the queued packets are subsequently processed.

If the traffic level is determined (block 350) to be greater than heavy, that is, very heavy, a fourth, still higher priority discrimination level 310d is selected. At this priority discrimination level 310d, a determination is made (block 360) as to whether the incoming packet has been assigned a low, medium, or high priority. If not, that is, the incoming packet has a critical priority as shown in FIG. 5, the incoming packet is accepted (block 312) and processed.

If it is determined (block 360) that the incoming packet is a low, medium or high priority packet, a determination is made (block 320) as to whether the queue for the assigned packet priority is fill. Thus, if it is determined (block 360) that the incoming packet is a low priority packet, a determination is made (block 320) as to whether the queue 330a for the packets assigned a low priority value is fall. Alternatively, if it is determined (block 360) that the incoming packet is a medium priority packet, a determination is made (block 320) as to whether the queue 330b for the packets assigned a medium priority value is full. Alternatively, if it is determined (block 360) that the incoming packet is a high priority packet, a determination is made (block 320) as to whether the queue 330c for the packets assigned a high priority value is full. If the queue of the assigned priority is not full, an incoming low priority packet may be queued (block 332) in the queue 330a as shown by the packet 340a, for example. Similarly an incoming medium priority packet may be queued (block 332) in the queue 330b for medium priority packets as shown by the packet 340b, for example. Similarly an incoming high priority packet may be queued (block 332) in the queue 330c for high priority packets as shown by the packet 340c, for example. In this manner, processing of the low, medium and high priority packets may be deferred until resource availability permits.

If it is determined (block 360) that the incoming packet is a low, medium or high priority packet, and it is determined (block 320) that the associated queue 330a, 330b or 330c for packets of the assigned priority is full, the packets of that priority may be discarded (block 342) until additional space in the associated queue 330a, 330b or 330c becomes available as the queued packets are subsequently processed. A queue 330d may be provided for critical priority packets 340d as well.

In this example, all incoming packets having an assigned priority value below the selected priority level are culled. It is appreciated that in other applications substantially all incoming packets having an assigned priority value below the selected priority level could be culled. For example, 75-100% of the incoming packets having an assigned priority value below the selected priority level could be may be discarded or queued.

In accordance with another aspect, individual traffic flows may be identified by the controller and packet culling rates may be selected for each traffic flow to reduce or avoid traffic congestion. As a consequence, the rate at which packets are culled from any one flow may be limited to a predetermined maximum, as appropriate. Still further, one or more selected flows may be culled at a high rate which can significantly reduce or eliminate the bandwidth available to those flows, providing substantially greater bandwidth for the remaining flows. Still further, one or more of these techniques may be employed alone or in various combinations as conditions warrant.

FIG. 7 illustrates another example of operations of a network controller for managing data traffic to reduce or eliminate overflow conditions. In this example, the network controller determines (block 400) the level of the traffic flowing through the network adapter 112. Again, these levels may include two levels such as light or heavy, for example, or may include several levels such as low, moderate, heavy or very heavy, for example. Other traffic levels may be utilized as well. The determination of the traffic levels may be based on a variety of criteria including the space remaining in a TOE buffer, the rate of data flow into the network adapter 112 from the network 108 versus the rate of data flow out of the network adapter 112 to the host computer, as well as other factors.

The controller also selects (block 402) one or more flows for culling, as a function of the determined traffic level. In a network controller having an offload engine such as a TOE, individual flows of packets may be readily identified by the network protocol connection through which each flows, depending upon the operations being performed at the controller level. In the illustrated embodiment, each individual traffic flow has a separate network protocol connection between a source and a destination. For an incoming flow of packets, the flow of packets can be from a source external to the host computer 102, through a separate network protocol connection, to a destination within the host computer. For example, in the TCP, each packet of a flow of packets in a TCP network connection between a source and a destination has identifier information in the packet header which identifies the TCP network connection to which it belongs and the TCP connection sequence numbers of each byte of the packet flowing through the TCP network connection. Other protocols may be used to establish a separate network protocol connection through which an individual flow of packets may flow.

Several factors may be used to determine which flow is selected. The factors to be weighed could include the particular protocol, such as TCP, UDP or others, being utilized by the network connection of the flow. Additional weight factors could include the payload or application such as a multimedia application, a backup application etc. Still other weight factors could include IP precedence factors such as minimum delay, maximum throughput, maximum reliability or minimum cost.

In accordance with another aspect, weight factors could include information which may not be available to a network controller lacking an offload engine such as a TOE. For example, TCP window size, TCP window utilization by a given flow and whether or not a flow is currently offloaded to the TOE device may be considered as well.

Upon selecting some or all of the flows for culling, a culling rate may be selected (block 404) for each selected flow, as a function of the traffic level. The selected culling rates may be applied (block 406) to toe selected culling rates. For example, as traffic becomes relatively heavy, packets could be culled from each of the traffic flows passing through the network controller. However, a ceiling or maximum culling rate may be selected for each flow. Since packet culling can have a greater impact on smaller flows such as on a percentage of flow basis, for example, imposing such a maximum can ensure that no one flow is disproportionately affected in terms of packet loss.

As another example, if traffic levels continue to rise, another culling technique may be imposed instead of or in combination with the previously described techniques. For example, one or more flows may be selected for significant or even drastic culling. As a consequence, the effects of congestion may be, in some applications, isolated to a relative few flows while the remaining flows experience little or no degradation due to packet loss.

Figure 8:
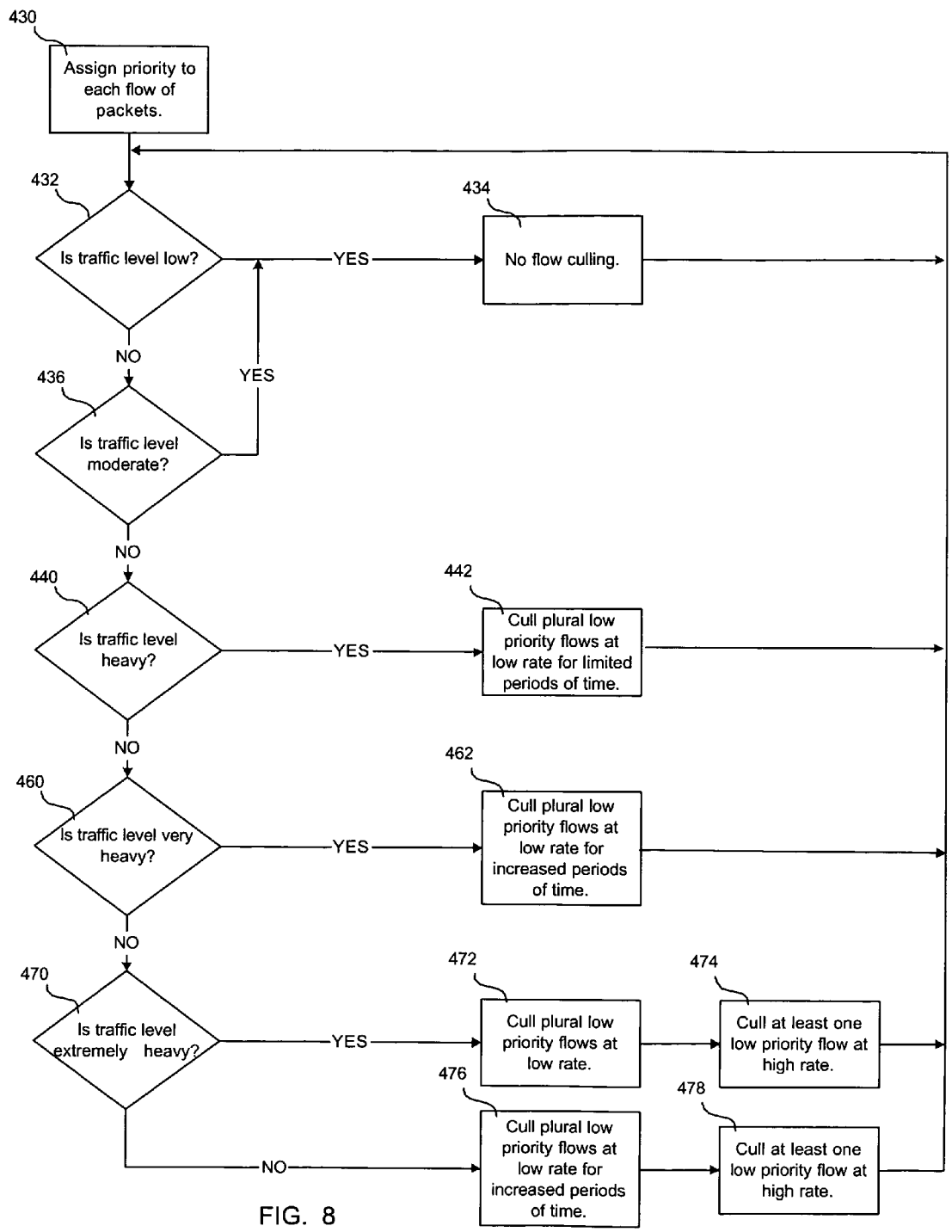
FIG. 8 illustrates still another embodiment of operations to manage congestion in a network controller in accordance with the present description.

FIG. 8 illustrates yet another example of operations of a network controller for managing data traffic to reduce or eliminate overflow conditions. In this embodiment, each incoming flow of packets is identified and assigned (block 430) a priority value. In this example, a flow may be assigned a priority value of high or low. It is appreciated that other priority values may be assigned as well. As previously mentioned, a variety of factors may be utilized to select flows. These and other factors may be weighed to assign priority levels to individual flows of packets from each source to each destination through the network adapter 112.

Also in this example, the traffic level may be determined to have one of five different possible levels, low, moderate, heavy, very heavy or extremely heavy. Again, there may be a greater or lesser number of different possible traffic levels, based on various criteria for measuring traffic, depending upon the particular application.

If the traffic level is determined (block 432) to be "low", all flows of packets may, in this example, be passed (block 434) for processing with no culling from any flow. A "low" traffic level may correspond, for example, with a traffic level in which no congestion is occurring. Similarly, in this example, if the traffic level is determined (block 436) to be moderate, all flows of packets may, in this example, be passed (block 434) for processing with no culling from any flow. A "moderate" traffic level may correspond, for example, with a traffic level in which buffers contain a minor backlog of packets to be processed.

If the traffic level is determined (block 440) to be "heavy", culling may be performed (block 442) on one or more flows, such as low priority flows, for example, at relatively low rates for limited periods of time. A "heavy" traffic level may correspond, for example, with a traffic level in which in which significant buffer usage is occurring.

FIG. 9a illustrates one technique in which a packet flow is culled in culling periods 450a which alternate with non-culling periods 450b in while little or no culling takes place. In this example, a level 452 indicates the maximum number of culled packets, expressed as a percentage of the flow, which are culled in each culling period 450a from each flow selected for culling. The percentage represented by the maximum level 452 will vary, depending upon the particular application.

Also in the example, the non-culling periods 450b are relatively long as compared to the culling periods 450a. Should the traffic level be determined (block 460) to be "very heavy," the proportionate lengths of the culling periods 450a relative to the no culling periods 450b may be lengthened (block 462) as shown for example in FIG. 9b. A "very heavy" traffic level may correspond, for example, with a traffic level in which packet loss is imminent.

In the example of FIG. 9b, the maximum culling level 452 expressed as a percentage may remain the same as the example of FIG. 9a. As a consequence, culling of packets can be increased as traffic levels increase while the maximum percentage being culled from any one flow at a time can remain the same. It is appreciated however, that the maximum culling levels 452 and the lengths of the culling and non-culling periods 450a, 450b may vary, depending upon the particular application as well as upon the particular traffic levels.

In yet another example, the non-culling periods 450b may eliminated such that a culling period 450a continues uninterrupted as long as traffic conditions warrant. Also, in this example, the culling techniques illustrated in FIGS. 9a, 9b may be applied to all flows, or just the low or lower priority flows or to one or more selected flows, depending upon the particular application.

If the traffic level is determined (block 470) to be extremely heavy, then, in addition to culling (block 472) one or more flows at a relatively low rate in a manner similar to that illustrated in FIG. 9a, for example, at least one flow, such as a low priority flow, may be selected for culling (block 474) at a substantially higher rate. Such a higher rate may include for example, drastic culling in which all or substantially all packets of the selected flow are culled.

An "extremely heavy" traffic level may correspond, for example, with a traffic level in which a minor sustained rate of packet loss is encountered. If it is determined (block 470) that the traffic is even higher than extremely heavy, then, in addition to culling (block 476) one or more flows at a relatively low rate but more frequently in a manner similar to that illustrated in FIG. 9b, for example, at least one flow, such as a low priority flow, may be selected for culling (block 478) at a substantially higher rate. A traffic level beyond "extremely heavy" may correspond, for example, with a traffic level in which a significant sustained rate of packet loss is encountered.

As set forth above, several factors may be used to determine which flow or flows are selected for relatively low rates of culling and which flow or flows are selected for more drastic rates of culling. Furthermore, once a flow is selected to have restricted bandwidth availability, choices may be made as to which packets to drop and which packets to process from the selected flow. For example, in many applications, a primary function of an acknowledgment packet is to update TCP state information. An acknowledgement packet often does not undergo any additional buffering once it is processed in this manner. Accordingly, the network controller may choose to accept acknowledgment packets rather than drop or queue them. Similarly, a packet that completes a set of packets which had been fragmented or completes a partially full receive buffer, may permit the contents of a buffer to be transferred to the host memory. As a consequence, additional buffer space may be freed. Hence, such a packet may also be a candidate for acceptance rather than being dropped.

By comparison, packets of a flow selected for restriction which may start a new set of defragmented packets to be reassembled, or may be placed in a receive buffer that is not already partially populated, may be candidates for being dropped or queued rather than being processed. It is appreciated that a single packet could both complete a receive buffer and start filling in another buffer. In such a situation, the network controller could drop or queue part of the packet which fills in another buffer, and process the part of the packet which completes a buffer. Because of the byte stream nature of TCP and the acknowledgment mechanism of TCP, it is believed that dropping part of a packet and processing part of a packet is consistent with the protocol specification.

In another aspect, packets may be dropped which have been buffered but not yet acknowledged as received. For example, fragmented IP datagrams or UDP packets of a selected flow which have been stored in the network controller buffers may be discarded. Accordingly, buffer space freed by discarding unacknowledged packets of the selected flow may be used for the packets of other flows. These weight factors including the identity of the protocol of the flow and the buffer space used by the flow, may be considered in the flow selection process, particularly when a more drastic culling technique is invoked.

As traffic flow ebbs, culling techniques may be made less restrictive. For example, as traffic flow drops back to extremely heavy, a switch may be made from frequent culling periods 450a as shown in FIG. 9b to less frequent culling periods 450a as shown in FIG. 9a, for example. Also, culling techniques may be dropped as traffic flow drops. For example, as traffic drops from extremely heavy to very heavy, a drastic culling technique (block 474) which substantially reduces or eliminates the bandwidth available to a particular flow may be dropped such that only a less restrictive technique (block 462) such as those shown in FIG. 9b is applied. Once traffic drops even further such as to moderate or low, for example, culling may be dropped altogether until congestion increases again.

Additional Embodiment Details

The described techniques for managing memory may be embodied as a method, apparatus or article of manufacture using standard programming and/or engineering techniques to produce software, firmware, hardware, or any combination thereof. The term "article of manufacture" as used herein refers to code or logic embodied in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are employed may further be accessible through a transmission media or from a file server over a network. In such cases, the article of manufacture in which the code is embodied may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present descriptions, and that the article of manufacture may comprise any information bearing medium known in the art.

In the described embodiments, certain operations were described as being performed by the operating system 110, system host computer, device driver 120, or the network interface 112. In alterative embodiments, operations described as performed by one of these may be performed by one or more of the operating system 110, system host computer, device driver 120, or the network interface 112. For example, culling operations described as being performed by the network adapter 112 may be performed by the host computer.

In the described embodiments, a transport protocol layer 121 was embodied in the network adapter 112 hardware. In alternative embodiments, the transport protocol layer may be embodied in the device driver or host memory 106.

In certain embodiments, the device driver and network adapter embodiments may be included in a computer system including a storage controller, such as a SCSI, Integrated Drive Electronics (IDE), RAID, etc., controller, that manages access to a non volatile storage device, such as a magnetic disk drive, tape media, optical disk, etc. In alternative embodiments, the network adapter embodiments may be included in a system that does not include a storage controller, such as certain hubs and switches.

In certain embodiments, the device driver and network adapter embodiments may be employed in a computer system including a video controller to render information to display on a monitor coupled to the computer system including the device driver and network adapter, such as a computer system comprising a desktop, workstation, server, mainframe, laptop, handheld computer, etc. Alternatively, the network adapter and device driver embodiments may be employed in a computing device that does not include a video controller, such as a switch, router, etc.

In certain embodiments, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logics of FIGS. 3,4, 7 and 8 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 10:
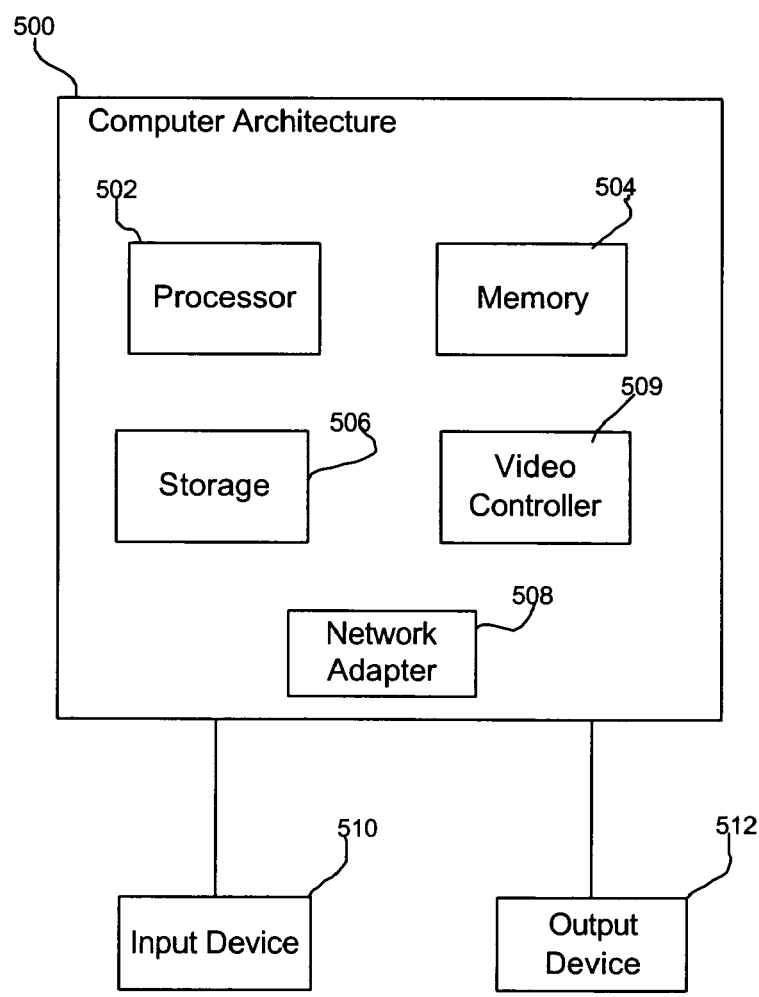
FIG. 10 illustrates an architecture that may be used with the described embodiments.

FIG. 10 illustrates one embodiment of a computer architecture 500 of the network components, such as the host computers and storage devices shown in FIG. 4. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. The architecture further includes a network adapter 508 to enable communication with a network, such as an Ethernet, a Fibre Channel Arbitrated Loop, etc. Further, the architecture may, in certain embodiments, include a video controller 509 to render information on a display monitor, where the video controller 509 may be employed on a video card or integrated on integrated circuit components mounted on the motherboard. As discussed, certain of the network devices may have multiple network cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The network adapter 508 may be embodied on a network card, such as a Peripheral Component Interconnect (PCI) card or some other I/O expansion card coupled to a motherboard, or on integrated circuit components mounted on the motherboard. The host interface may employ any of a number of protocols including PCI EXPRESS.

Details on the PCI architecture are described in "PCI Local Bus, Rev. 2.3", published by the PCI-SIG. Details on the TCP protocol are described in "Internet Engineering Task Force (IETF) Request for Comments (RFC) 793," published September 1981 and details on the IP protocol are described in "Internet Engineering Task Force Request for Comments (RFC) 791, published September 1981. Details on the UDP protocol are described in "Internet Engineering Task Force Request for Comments (RFC) 798, published August, 1980. Details on the Fibre Channel architecture are described in the technology specification "Fibre Channel Framing and Signaling Interface", document no. ISO/IEC AWI 14165-25. Details on the Ethernet protocol are described in "IEEE std. 802.3," published Mar. 8, 2002. Details on the RDMA protocol are described in the technology specification "Architectural Specifications for RDMA over TCP/IP" Version 1.0 (October 2003).

The foregoing description of various embodiments has been presented for the purposes of illustration and description. It is not intended to be exhaustive or to limit to the precise form disclosed. Many modifications and variations are possible in light of the above teaching. It is intended that the scope not be limited by this detailed description.

What is claimed is:

1. A method of a processor performing operations, the operations comprising:
   determining the level of packet traffic coming into a network controller;
   selecting a priority level as a function of the determined traffic level;
   assigning priority values to incoming packets;
   accepting and processing incoming packets having an assigned priority value above said selected priority level; and
   culling incoming packets having an assigned priority value below the selected priority level so that incoming packets having an assigned priority value below the selected priority level are culled as a function of the determined traffic level wherein said culling includes at least one of a) queuing in a processing suspension queue at least some incoming packets having a priority below said selected priority level to separate said packets being culled from unculled incoming packets and suspending processing of all of said packets in said queue, and b) discarding at least some incoming packets having a priority below the selected priority level;
   wherein said accepting and processing incoming packets having an assigned priority value above said selected priority level includes bypassing said culling so that said queuing in a processing suspension queue and said discarding are both bypassed so that incoming packets having an assigned priority value above the selected priority level bypass said culling as a function of the determined traffic level.

2. The method of claim 1 wherein said determining includes determining a first traffic level; said selecting includes selecting a first priority level wherein all packets have a priority greater than said first priority level so that said culling culls no packets, and said accepting and processing accepts and processes all packets;
   wherein in response to an increase in traffic level, said determining includes determining a second traffic level higher than said first traffic level; said selecting includes selecting a second priority level higher than said first priority level wherein a first type of packets each has a priority level below said second priority level so that said culling culls packets of said first type and, wherein the remaining packets are of types having a priority greater than said second priority level so that said accepting and processing accepts and processes all packets except said packets of said first type; and
   wherein in response to a further increase in traffic level, said determining includes determining a third traffic level higher than said second traffic level; said selecting includes selecting a third priority level higher than said second priority level wherein a second type of packets and said first type of packets each have a priority level below said third priority level so that said culling culls packets of said first type and said second type, wherein the remaining packets are of a third type having a priority greater than said third priority level so that said accepting and processing accepts and processes all packets except said packets of said first type and said second type.

3. The method of claim 2 wherein said culling of packets of said first type includes queuing said packets of said first type in a queue of packets of said first type and discarding packets of said first type when said queue of packets of said first type is full, and said culling of packets of said second type includes queuing said packets of said second type in a queue of packets of said second type and discarding packets of said second type when said queue of packets of said second type is full.

4. The method of claim 1 wherein said priority values include a first priority value and a second priority value higher than said first priority value and wherein said culling culls packets of said first priority value and said assigning assigns said first priority value to at least one type of packets selected from a first group of packet types which consists of Internet Control Message Protocol packets, Address Resolution Protocol packets, Transmission Control Protocol SYN packets.

5. The method of claim 4 wherein accepting and processing accepts and processes incoming packets having said second priority value and said assigning assigns said second priority value to at least one type of packets selected from a second group of packet types which consists of Internet Protocol fragmented packets, Transmission Control Protocol ACK packets.

6. A method of a processor performing operations, the operations comprising:
   determining the level of packet traffic coming into a network controller of a host from a plurality of sources external to said host;
   identifying individual traffic flows of packets within said incoming packets, each individual traffic flow having a separate network protocol connection between an external source and an internal destination of the network controller host;
   selecting as a function of said determined traffic level, at least one traffic flow for culling;
   selecting as a function of said determined traffic level, another traffic flow for accepting and processing incoming packets of said another traffic flow;
   selecting as a function of said traffic level, a culling rate for each traffic flow to be culled; and
   culling selected traffic flows to be culled at said selected culling rates wherein said culling includes at least one of a) queuing at least some incoming packets in a processing suspension queue to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;
   wherein said accepting and processing incoming packets of said another traffic flow includes bypassing said culling so that said queuing in a processing suspension queue and said discarding are both bypassed so that incoming packets having an assigned priority value above the selected priority level bypass said culling as a function of the determined traffic level.

7. The method of claim 6 wherein all identified traffic flows are selected for culling at a particular traffic level.

8. The method of claim 6 wherein each selected culling rate is a percentage of packets to be discarded within a flow wherein the packets culled from each selected flow does not exceed a predetermined maximum percentage for each flow.

9. The method of claim 6 wherein said culling includes periods of culling alternating with periods of no culling and said culling rate selecting includes selecting a first proportion of lengths of culling periods relative to lengths of periods of no culling.

10. The method of claim 9 wherein said culling rate selecting includes selecting a second proportion of lengths of culling periods relative to lengths of periods of no culling wherein said second proportion is larger than said first proportion and is selected as a function of a second traffic level higher than said first traffic level.

11. The method of claim 6 wherein said culling rate selecting includes selecting a first culling rate for a first flow, and selecting a second culling rate higher than said first culling rate, for a second flow.

12. The method of claim 11 wherein said traffic flow selecting includes assigning priority values to said first and second flows and wherein said second flow is assigned a priority value lower than the assigned priority value of said first flow.

13. The method of claim 12 wherein said flow culling includes assigning priority values to packets of flows, discarding queued packets of said second flow having a first priority value, accepting and processing packets of said second flow having a second priority value higher than said first priority value.

14. The method of claim 13 wherein said assigning assigns said first priority value to packets of at least one type selected from a first group of packet types which consists of Internet Protocol fragmented packets which initiate a set of fragmented packets to be reassembled, packets to be stored in an empty buffer, unacknowledged packets stored in a buffer, Internet Control Message Protocol packets, Address Resolution Protocol packets, Transmission Control Protocol SYN packets.

15. The method of claim 13 wherein said assigning assigns said second priority value to packets of at least one type selected from a second group of packet types which consists of Internet Protocol fragmented packets which complete a set of fragmented packets, packets which complete a partially full receive buffer, Transmission Control Protocol ACK packets.

16. The method of claim 13 wherein said assigning assigns said first priority value to a first portion of a single packet in which said first portion is to be stored in an empty buffer and assigns said second priority value to a second portion of said single packet in which said second portion completes a partially full receive buffer.

17. The method of claim 6 wherein said flow selecting is a function of at least one factor selected from a group of factors consisting of flow protocol, flow payload application, flow Transmission Control Protocol window size, flow Transmission Control Protocol window utilization, flow offload engine utilization.

18. The method of claim 11 wherein said second culling rate culls packets of said second flow.

19. An article comprising at least one of hardware and a combination of hardware and software, said at least one including machine readable instructions stored on the hardware that when executed, causes the machine to:
   determine the level of packet traffic coming into a network controller;
   select a priority level as a function of the determined traffic level;
   assign priority values to incoming packets;
   accept and process incoming packets having an assigned priority value above said selected priority level; and
   cull incoming packets having an assigned priority value below the selected priority wherein said culling includes at least one of a) queuing in a processing suspension queue at least some incoming packets having a priority below said selected priority level to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;
   wherein said accepting and processing incoming packets having an assigned priority value above said selected priority level includes bypassing said culling so that said queuing in a processing suspension queue and said discarding are both bypassed so that incoming packets having an assigned priority value above the selected priority level bypass said culling as a function of the determined traffic level.

20. The article of claim 19 wherein said determining includes determining a first traffic level; said selecting includes selecting a first priority level wherein all packets have a priority greater than said first priority level so that said culling culls no packets, and said accepting and processing accepts and processes all packets;
   wherein in response to an increase in traffic level, said determining includes determining a second traffic level higher than said first traffic level; said selecting includes selecting a second priority level higher than said first priority level wherein a first type of packets each has a priority level below said second priority level so that said culling culls packets of said first type and, wherein the remaining packets are of types having a priority greater than said second priority level so that said accepting and processing accepts and processes all packets except said packets of said first type; and
   wherein in response to a further increase in traffic level, said determining includes determining a third traffic level higher than said second traffic level; said selecting includes selecting a third priority level higher than said second priority level wherein a second type of packets and said first type of packets each have a priority level below said third priority level so that said culling culls packets of said first type and said second type, wherein the remaining packets are of types having a priority greater than said third priority level so that said accepting and processing accepts and processes all packets except said packets of said first type and said second type.

21. The article of claim 20 wherein said culling of packets of said first type includes queuing said packets of said first type in a queue of packets of said first type and discarding packets of said first type when said queue of packets of said first type is full, and said culling of packets of said second type includes queuing said packets of said second type in a queue of packets of said second type and discarding packets of said second type when said queue of packets of said second type is full.

22. The article of claim 19 wherein said priority values include a first priority value and a second priority value higher than said first priority value and wherein said culling culls packets of said first priority value and said assigning assigns said first priority value to at least one type of packets selected from a first group of packet types which consists of Internet Control Message Protocol packets, Address Resolution Protocol packets, Transmission Control Protocol SYN packets.

23. The article of claim 22 wherein accepting and processing accepts and processes incoming packets having said second priority value and said assigning assigns said second priority value to at least one type of packets selected from a second group of packet types which consists of Internet Protocol fragmented packets, Transmission Control Protocol ACK packets.

24. An article comprising at least one of hardware and a combination of hardware and software, said at least one including machine readable instructions stored on the hardware that when executed, causes the machine to:
   determine the level of packet traffic coming into a network controller of a host from a plurality of sources external to said host;
   identify individual traffic flows of packets within said incoming packets, each individual traffic flow having a separate network protocol connection between an external source and an internal destination of the network controller host;
   select as a function of said determined traffic level, at least one traffic flow for culling;
   select as a function of said determined traffic level, another traffic flow for accepting and processing incoming packets of said another traffic flow;
   select as a function of said traffic level, a culling rate for each traffic flow to be culled; and
   cull selected traffic flows at said selected culling rates wherein said culling includes at least one of a) queuing in a processing suspension queue at least some incoming packets to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;
   wherein said accepting and processing incoming packets of said another traffic flow includes bypassing said culling so that said queuing in a processing suspension queue and said discarding are both bypassed so that incoming packets having an assigned priority value above the selected priority level bypass said culling as a function of the determined traffic level.

25. The article of claim 24 wherein all identified traffic flows are selected for culling at a particular traffic level.

26. The article of claim 24 wherein each selected culling rate is a percentage of packets to be discarded within a flow wherein the packets culled from each selected flow does not exceed a predetermined maximum percentage for each flow.

27. The article of claim 24 wherein said culling includes periods of culling alternating with periods of no culling and said culling rate selecting includes selecting a first proportion of lengths of culling periods relative to lengths of periods of no culling.

28. The article of claim 27 wherein said culling rate selecting includes selecting a second proportion of lengths of culling periods relative to lengths of periods of no culling wherein said second proportion is larger than said first proportion and is selected as a function of a second traffic level higher than said first traffic level.

29. The article of claim 24 wherein said culling rate selecting includes selecting a first culling rate for a first flow, and selecting a second culling rate higher than said first culling rate, for a second flow.

30. The article of claim 29 wherein said traffic flow selecting includes assigning priority values to said first and second flows and wherein said second flow is assigned a priority value lower than the assigned priority value of said first flow.

31. The article of claim 30 wherein said flow culling includes assigning priority values to packets of flows, discarding packets of said second flow having a first priority value, accepting and processing packets of said second flow having a second priority value higher than said first priority value.

32. The article of claim 31 wherein said assigning assigns said first priority value to packets of at least one type selected from a first group of packet types which consists of Internet Protocol fragmented packets which initiate a set of fragmented packets to be reassembled, packets to be stored in an empty buffer, unacknowledged packets stored in a buffer, Internet Control Message Protocol packets, Address Resolution Protocol packets, Transmission Control Protocol SYN packets.

33. The article of claim 31 wherein said assigning assigns said second priority value to packets of at least one type selected from a second group of packet types which consists of Internet Protocol fragmented packets which complete a set of fragmented packets, packets which complete a partially full receive buffer, Transmission Control Protocol ACK packets.

34. The article of claim 31 wherein said assigning assigns said first priority value to a first portion of a single packet in which said first portion is to be stored in an empty buffer and assigns said second priority value to a second portion of said single packet in which said second portion completes a partially full receive buffer.

35. The article of claim 24 wherein said flow selecting is a function of at least one factor selected from a group of factors consisting of flow protocol, flow payload application, flow Transmission Control Protocol window size, flow Transmission Control Protocol window utilization, flow offload engine utilization.

36. The article of claim 29 wherein said second culling rate culls packets of said second flow.

37. A system for use with a network, comprising:
   at least one system memory which includes an operating system;
   a motherboard;
   a processor mounted on the motherboard and coupled to the memory;
   an expansion card coupled to said motherboard;
   a network adapter mounted on said expansion card; and
   a device driver executable by the processor in the system memory for said network adapter, wherein the network adapter is adapted to:
      determine the level of packet traffic coming into said network adapter;
      select a priority level as a function of the determined traffic level;
      assign priority values to incoming packets;

accept and process incoming packets having an assigned priority value above said selected priority level; and cull incoming packets having an assigned priority value below the selected priority level so that incoming packets having an assigned priority value below the selected priority level are culled as a function of the determined traffic level wherein said culling includes at least one of a) queuing in a processing suspension queue at least some incoming packets having a priority below said selected priority level to separate said packets being culled from unculled incoming packets and suspending processing of all of said packets in said queue, and b) discarding at least some incoming packets having a priority below the selected priority level;

wherein said accepting and processing incoming packets having an assigned priority value above said selected priority level includes bypassing said culling so that said queuing in a processing suspension queue and said discarding are both bypassed so that incoming packets having an assigned priority value above the selected priority level bypass said culling as a function of the determined traffic level.

38. The system of claim 37 wherein said determining includes determining a first traffic level; said selecting includes selecting a first priority level wherein all packets have a priority greater than said first priority level so that said culling culls no packets, and said accepting and processing accepts and processes all packets;

wherein in response to an increase in traffic level, said determining includes determining a second traffic level higher than said first traffic level; said selecting includes selecting a second priority level higher than said first priority level wherein a first type of packets each has a priority level below said second priority level so that said culling culls packets of said first type and, wherein the remaining packets are of types having a priority greater than said second priority level so that said accepting and processing accepts and processes all packets except said packets of said first type; and wherein in response to a further increase in traffic level, said determining includes determining a third traffic level higher than said second traffic level; said selecting includes selecting a third priority level higher than said second priority level wherein a second type of packets and said first type of packets each have a priority level below said third priority level so that said culling culls packets of said first type and said second type, wherein the remaining packets are of types having a priority greater than said third priority level so that said accepting and processing accepts and processes all packets except said packets of said first type and said second type.

39. The system of claim 38 wherein said adapter is adapted to maintain queues of packets and wherein said culling of packets of said first type includes queuing said packets of said first type in a queue of packets of said first type and discarding packets of said first type when said queue of packets of said first type is full, and said culling of packets of said second type includes queuing said packets of said second type in a queue of packets of said second type and discarding packets of said second type when said queue of packets of said second type is full.

40. The system of claim 37 wherein said priority values include a first priority value and a second priority value higher than said first priority value and wherein said culling culls packets of said first priority value and said assigning assigns said first priority value to at least one type of packets selected from a first group of packet types which consists of Internet Control Message Protocol packets, Address Resolution Protocol packets, Transmission Control Protocol SYN packets.

41. The system of claim 40 wherein accepting and processing accepts and processes incoming packets having said second priority value and said assigning assigns said second priority value to at least one type of packets selected from a second group of packet types which consists of Internet Protocol fragmented packets, Transmission Control Protocol ACK packets.

42. A system for use with a network having a plurality of sources, comprising:

at least one system memory which includes an operating system;

a plurality of packet destinations within said system;

a motherboard;

a processor mounted on the motherboard and coupled to the memory;

an expansion card coupled to said motherboard;

a network adapter mounted on said expansion card and having a transport protocol offload engine and a plurality of buffers; and a device driver executable by the processor in the system memory for said network adapter wherein the network adapter is adapted to:

determine the level of packet traffic coming into said network adapter of a host from a plurality of sources external to said host;

identify individual traffic flows of packets within said incoming packets, each individual traffic flow having a separate network protocol connection between a network source and a destination of the system;

select as a function of said determined traffic level, at least one traffic flow for culling;

select as a function of said determined traffic level, another traffic flow for accepting and processing incoming packets of said another traffic flow;

select as a function of said traffic level, a culling rate for each traffic flow to be culled; and cull selected traffic flows at said selected culling rates wherein said culling includes at least one of a) queuing in a processing suspension queue at least some incoming packets to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;

wherein said accepting and processing incoming packets of said another traffic flow includes bypassing said culling so that said queuing in a processing suspension queue and said discarding are both bypassed so that incoming packets having an assigned priority value above the selected priority level bypass said culling as a function of the determined traffic level.

43. The system of claim 42 wherein all identified traffic flows are selected for culling at a particular traffic level.

44. The system of claim 42 wherein each selected culling rate is a percentage of packets to be discarded within a flow wherein the packets culled from each selected flow does not exceed a predetermined maximum percentage for each flow.

45. The system of claim 42 wherein said culling includes periods of culling alternating with periods of no culling and said culling rate selecting includes selecting a first proportion of lengths of culling periods relative to lengths of periods of no culling.

46. The system of claim 45 wherein said culling rate selecting includes selecting a second proportion of lengths of culling periods relative to lengths of periods of no culling wherein said second proportion is larger than said first proportion and is selected as a function of a second traffic level higher than said first traffic level.

47. The system of claim 42 wherein said culling rate selecting includes selecting a first culling rate for a first flow, and selecting a second culling rate higher than said first culling rate, for a second flow.

48. The system of claim 47 wherein said traffic flow selecting includes assigning priority values to said first and second flows and wherein said second flow is assigned a priority value lower than the assigned priority value of said first flow.

49. The system of claim 48 wherein said flow culling includes assigning priority values to packets of flows, discarding packets of said second flow having a first priority value, accepting and processing packets of said second flow having a second priority value higher than said first priority value.

50. The system of claim 49 wherein said assigning assigns said first priority value to packets of at least one type selected from a first group of packet types which consists of Internet Protocol fragmented packets which initiate a set of fragmented packets to be reassembled, packets to be stored in an empty buffer of said adapter, unacknowledged packets stored in a buffer of said adapter, Internet Control Message Protocol packets, Address Resolution Protocol packets, Transmission Control Protocol SYN packets.

51. The system of claim 49 wherein said assigning assigns said second priority value to packets of at least one type selected from a second group of packet types which consists of Internet Protocol fragmented packets which complete a set of fragmented packets, packets which complete a partially full receive buffer of said adapter, Transmission Control Protocol ACK packets.

52. The system of claim 49 wherein said assigning assigns said first priority value to a first portion of a single packet in which said first portion is to be stored in an empty buffer of said adapter and assigns said second priority value to a second portion of said single packet in which said second portion completes a partially full receive buffer of said adapter.

53. The system of claim 42 wherein said flow selecting is a function of at least one factor selected from a group of factors consisting of flow protocol, flow payload application, flow Transmission Control Protocol window size, flow Transmission Control Protocol window utilization, offload engine utilization.

54. The system of claim 47 wherein said second culling rate culls packets of said second flow.

55. A device for use with packets coming from a network, comprising:
a network controller adapted to:
determine the level of packet traffic coming into said network controller;
select a priority level as a function of the determined traffic level;
assign priority values to incoming packets;
accept and process incoming packets having an assigned priority value above said selected priority level; and
cull incoming packets having an assigned priority value below the selected priority level wherein said culling includes at least one of a) queuing in a processing suspension queue at least some incoming packets having a priority below said selected priority level to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;
wherein said accepting and processing incoming packets having an assigned priority value above said selected priority level includes bypassing said culling so that said queuing in a processing suspension queue and said discarding are both bypassed so that incoming packets having an assigned priority value above the selected priority level bypass said culling as a function of the determined traffic level.

56. The device of claim 55 wherein said determining includes determining a first traffic level; said selecting includes selecting a first priority level wherein all packets have a priority greater than said first priority level so that said culling culls no packets, and said accepting and processing accepts and processes all packets;
wherein in response to an increase in traffic level, said determining includes determining a second traffic level higher than said first traffic level; said selecting includes selecting a second priority level higher than said first priority level wherein a first type of packets each has a priority level below said second priority level so that said culling culls packets of said first type and, wherein the remaining packets are of types having a priority greater than said second priority level so that said accepting and processing accepts and processes all packets except said packets of said first type; and
wherein in response to a further increase in traffic level, said determining includes determining a third traffic level higher than said second traffic level; said selecting includes selecting a third priority level higher than said second priority level wherein a second type of packets and said first type of packets each have a priority level below said third priority level so that said culling culls packets of said first type and said second type, wherein the remaining packets are of types having a priority greater than said third priority level so that said accepting and processing accepts and processes all packets except said packets of said first type and said second type.

57. The device of claim 56 wherein said adapter is adapted to maintain queues of packets and wherein said culling of packets of said first type includes queuing said packets of said first type in a queue of packets of said first type and discarding packets of said first type when said queue of packets of said first type is full, and said culling of packets of said second type includes queuing said packets of said second type in a queue of packets of said second type and discarding packets of said second type when said queue of packets of said second type is full.

58. The device of claim 55 wherein said priority values include a first priority value and a second priority value higher than said first priority value and wherein said culling culls packets of said first priority value and said assigning assigns said first priority value to at least one type of packets selected from a first group of packet types which consists of Internet Control Message Protocol packets, Address Resolution Protocol packets, Transmission Control Protocol SYN packets.

59. The device of claim 58 wherein accepting and processing accepts and processes incoming packets having said second priority value and said assigning assigns said second priority value to at least one type of packets selected from a second group of packet types which consists of Internet Protocol fragmented packets, Transmission Control Protocol ACK packets.

60. A device for use with a network having a plurality of sources, comprising:
- at least one device memory which includes an operating device;
- a plurality of packet destinations within said system;
- a motherboard;
- a processor mounted on the motherboard and coupled to the memory;
- an expansion card coupled to said motherboard;
- a network adapter mounted on said expansion card and having a transport protocol offload engine and a plurality of buffers; and
- a device driver executable by the processor in the system memory for said network adapter wherein the network adapter is adapted to:
  - determine the level of packet traffic coming into said network adapter of a host from a plurality of sources external to said host;
  - identify individual traffic flows of packets within said incoming packets, each individual traffic flow having a separate network protocol connection between a network source and a destination of the system;
  - select as a function of said determined traffic level, at least one traffic flow for culling;
  - select as a function of said determined traffic level, another traffic flow for accepting and processing incoming packets of said another traffic flow;
  - select as a function of said traffic level, a culling rate for each traffic flow to be culled; and
- cull selected traffic flows at said selected culling rates wherein said culling includes at least one of a) queuing in a processing suspension queue at least some incoming packets to separate said packets being culled from unculled incoming packets and suspending processing of all of said packets in said queue, and b) discarding at least some incoming packets having a priority below the selected priority level so that incoming packets having an assigned priority value below the selected priority level are culled as a function of the determined traffic level;
  - wherein said accepting and processing incoming packets of said another traffic flow includes bypassing said culling so that said queuing in a processing suspension queue and said discarding are both bypassed so that incoming packets having an assigned priority value above the selected priority level bypass said culling as a function of the determined traffic level.

61. The device of claim 60 wherein all identified traffic flows are selected for culling at a particular traffic level.

62. The device of claim 60 wherein each selected culling rate is a percentage of packets to be discarded within a flow wherein the packets culled from each selected flow does not exceed a predetermined maximum percentage for each flow.

63. The device of claim 60 wherein said culling includes periods of culling alternating with periods of no culling and said culling rate selecting includes selecting a first proportion of lengths of culling periods relative to lengths of periods of no culling.

64. The device of claim 63 wherein said culling rate selecting includes selecting a second proportion of lengths of culling periods relative to lengths of periods of no culling wherein said second proportion is larger than said first proportion and is selected as a function of a second traffic level higher than said first traffic level.

65. The device of claim 60 wherein said culling rate selecting includes selecting a first culling rate for a first flow, and selecting a second culling rate higher than said first culling rate, for a second flow.

66. The device of claim 65 wherein said traffic flow selecting includes assigning priority values to said first and second flows and wherein said second flow is assigned a priority value lower than the assigned priority value of said first flow.

67. The device of claim 66 wherein said flow culling includes assigning priority values to packets of flows, discarding packets of said second flow having a first priority value, accepting and processing packets of said second flow having a second priority value higher than said first priority value.

68. The device of claim 67 wherein said assigning assigns said first priority value to packets of at least one type selected from a first group of packet types which consists of Internet Protocol fragmented packets which initiate a set of fragmented packets to be reassembled, packets to be stored in an empty buffer of said adapter unacknowledged packets stored in a buffer of said adapter, Internet Control Message Protocol packets, Address Resolution Protocol packets, Transmission Control Protocol SYN packets.

69. The device of claim 67 wherein said assigning assigns said second priority value to packets of at least one type selected from a second group of packet types which consists of Internet Protocol fragmented packets which complete a set of fragmented packets, packets which complete a partially full receive buffer of said adapter, Transmission Control Protocol ACK packets.

70. The device of claim 67 wherein said assigning assigns said first priority value to a first portion of a single packet in which said first portion is to be stored in an empty buffer of said adapter , and assigns said second priority value to a second portion of said single packet in which said second portion completes a partially full receive buffer of said adapter .

71. The device of claim 60 wherein said flow selecting is a function of at least one factor selected from a group of factors consisting of flow protocol, flow payload application, flow Transmission Control Protocol window size, flow Transmission Control Protocol window utilization, offload engine utilization.

72. The device of claim 65 wherein said second culling rate culls packets of said second flow.

* * * * *